US011360473B2

(12) United States Patent
Hanawa et al.

(10) Patent No.: US 11,360,473 B2
(45) Date of Patent: Jun. 14, 2022

(54) VEHICLE CONTROLLER DEVICE

(71) Applicant: TOYOTA JIDOSHA KABUSHIKI KAISHA, Toyota (JP)

(72) Inventors: Atsushi Hanawa, Miyoshi (JP); Yasuki Nakagawa, Toyota (JP); Makoto Matsushita, Ichinomiya (JP); Yusuke Yokota, Susono (JP); Tomoyuki Kuriyama, Hadano (JP); Tae Sugimura, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 56 days.

(21) Appl. No.: 16/884,732

(22) Filed: May 27, 2020

(65) Prior Publication Data
US 2021/0018913 A1 Jan. 21, 2021

(30) Foreign Application Priority Data

Jul. 16, 2019 (JP) .............................. JP2019-131267

(51) Int. Cl.
*G05D 1/00* (2006.01)
*G05D 1/02* (2020.01)
*G01C 21/34* (2006.01)

(52) U.S. Cl.
CPC ........... *G05D 1/0061* (2013.01); *G01C 21/34* (2013.01); *G05D 1/0011* (2013.01); *G05D 1/0214* (2013.01); *G05D 2201/0213* (2013.01)

(58) Field of Classification Search
CPC .. G05D 1/0061; G05D 1/0011; G05D 1/0214; G05D 2201/0213; G01C 21/34
See application file for complete search history.

(56) References Cited

U.S. PATENT DOCUMENTS

2019/0204830 A1* 7/2019 Ogura .................. G05D 1/0011

FOREIGN PATENT DOCUMENTS

| CN | 106846901 A | * | 6/2017 |
| JP | 2006-301963 A | | 11/2006 |
| JP | 2016-45714 A | | 4/2016 |

OTHER PUBLICATIONS

English Translation of CN-106846901-A.*

* cited by examiner

*Primary Examiner* — Rami Khatib
*Assistant Examiner* — Shahira Baajour
(74) *Attorney, Agent, or Firm* — Oliff PLC

(57) ABSTRACT

A vehicle controller device is provided including a travel control section configured to control autonomous driving and remote driving, a biometric information acquisition section configured to acquire biometric information of an occupant, a state determination section configured to determine, based on the biometric information acquired by the biometric information acquisition section, whether or not an abnormality predicted state has arisen in which manual driving by operation by the occupant is predicted to become compromised and also whether or not an abnormal state has arisen in which manual driving is compromised, a notification section configured to notify an operation device of a determined state in cases in which either the abnormality predicted state or the abnormal state is determined to have arisen, and a reception section capable of receiving operation-ready information indicating that operation by a remote operator is possible from the operation device in response to the notification.

4 Claims, 8 Drawing Sheets

VEHICLE CONTROLLER DEVICE

CROSS-REFERENCE TO RELATED APPLICATION

This application is based on and claims priority under 35 USC 119 from Japanese Patent Application No. 2019-131267 filed on Jul. 16, 2019, the disclosure of which is incorporated by reference herein.

BACKGROUND

Technical Field

The present disclosure relates to a vehicle controller device capable of autonomous driving and remote driving.

Related Art

Japanese Patent Application Laid-Open (JP-A) No. 2016-045714 discloses technology in which, in cases in which abnormal behavior of a driver continues for a predetermined determination period or longer during vehicle travel, the driver is determined to be in an abnormal state that impairs driving of the vehicle.

In a vehicle disclosed in JP-A No. 2016-045714, the vehicle is slowed or stopped and pulled over to the roadside when the driver is determined to be in the abnormal state.

In vehicles capable of autonomous driving and remote driving, it is possible to avoid risk by switching to remote driving in cases in which the driver is determined to be in an abnormal state.

SUMMARY

An object of the present disclosure is to provide a vehicle controller device capable of securing a remote driving operator at at least one timing out of before an abnormal state in which manual driving by occupant operation is compromised has arisen, or when such an abnormal state has arisen.

A vehicle controller device according to a first aspect of the present disclosure includes a communication section configured to receive operation information for operating a vehicle from an operation device disposed externally to the vehicle and operated by a remote operator, an acquisition section configured to acquire peripheral information regarding a periphery of the vehicle from a peripheral information detection section, a travel plan generation section configured to generate a travel plan for the vehicle based on the peripheral information of the vehicle, a travel control section configured to control autonomous driving in which the vehicle travels based on the travel plan generated by the travel plan generation section, and also control remote driving in which the vehicle travels based on the operation information received by the communication section, a biometric information acquisition section configured to acquire biometric information of an occupant, a state determination section configured to determine, based on the biometric information acquired by the biometric information acquisition section, whether or not an abnormality predicted state has arisen in which manual driving by operation by the occupant is predicted to become compromised, and also whether or not an abnormal state has arisen in which manual driving is compromised, a notification section configured to notify the operation device of a determined state in cases in which either the abnormality predicted state or the abnormal state is determined to have arisen by the state determination section, and a reception section is configured to enable receipt of operation-ready information from the operation device in response to the notification to indicate that operation by the remote operator is possible.

The vehicle controller device according to the first aspect of the present disclosure is capable of implementing autonomous driving, this being self-driven travel, and remote driving by the operation device. In cases in which the vehicle controller device determines, based on the biometric information, that the abnormality predicted state has arisen in which manual driving by the occupant is predicted to become compromised, or that the abnormal state has arisen in which manual driving is compromised, the vehicle controller device notifies the operation device of the determined state.

The vehicle controller device enables receipt of the operation-ready information from the operation device in response to this notification to indicate that remote driving of the vehicle by the remote operator is possible. The vehicle is thus capable of securing a remote operator at at least one timing out of before the occupant is determined to have reached the abnormal state, or when the abnormal state is determined to have arisen.

A vehicle controller device according to a second aspect of the present disclosure is the configuration of the first aspect, wherein the travel control section is further configured to switch from the manual driving to the remote driving in cases in which the occupant is determined to be in the abnormal state by the state determination section after the operation-ready information has been received by the reception section in response to the notification.

When the vehicle controller device according to the second aspect of the present disclosure performs notification to inform the operation device of the abnormality predicted state or abnormal state of the occupant, automatic switching from manual driving to remote driving is performed in cases in which the occupant is determined to be in the abnormal state after confirming that a remote operator has been secured. This enables a smooth switch to remote driving when an occupant abnormality has arisen.

A vehicle controller device according to a third aspect of the present disclosure is the configuration of the first aspect, wherein the travel control section is further configured to switch from the manual driving to the autonomous driving in cases in which the occupant is determined to be in the abnormal state by the state determination section before the operation-ready information has been received by the reception section in response to the notification.

When the vehicle controller device of the according to the third aspect of the present disclosure performs notification to inform the operation device of the abnormality predicted state or the abnormal state of the occupant, manual driving is switched to autonomous driving in cases in which the occupant is determined to be in the abnormal state before having confirmed that a remote operator has been secured. The vehicle can thus continue to travel safely by switching to autonomous driving as an alternative in cases in which an immediate switch to a remote operator cannot be performed when an occupant abnormality has arisen.

A vehicle controller device according to a fourth aspect of the present disclosure is the configuration of the third aspect, wherein the travel control section is further configured to switch from the autonomous driving to the remote driving in cases in which the operation-ready information is received by the reception section during the autonomous driving.

In the vehicle controller device according to the fourth aspect of the present disclosure, when the occupant is determined to be in the abnormal state, travel is performed by autonomous driving until the operation-ready information is received, and is then switched from autonomous driving to remote driving when the operation-ready information has been received. This enables a smooth switch to remote operation while maintaining safe travel of the vehicle when an occupant abnormality has arisen.

A vehicle controller device according to a fifth aspect of the present disclosure is the configuration of any one of the first aspect to the fourth aspect, further including a supplied information reception section configured to receive risk information indicating that a manner of travel is high-risk from another vehicle traveling in the vicinity of the vehicle. The state determination section is configured to determine whether or not the abnormality predicted state has arisen based on at least one out of the biometric information or the received risk information, and the notification section notifies the operation device of the state determined the state determination section.

In the vehicle controller device according to the fifth aspect of the present disclosure, determination as to whether or not the abnormality predicted state has arisen is made based on at least one out of the biometric information of the occupant or the risk information supplied from the other vehicle traveling in the vicinity of the vehicle, and the operation device is notified of this determination. The abnormality predicted state can thus been determined based on information supplied from the other vehicle as well as the biometric information of the occupant. Namely, determination of the abnormality predicted state is multifaceted, thus enabling a remote driving operator to be secured before the occupant reaches the abnormal state.

The present disclosure is capable of securing a remote driving operator at at least one timing out of before an abnormal state of an occupant in which manual driving by the occupant operation is compromised has arisen, or when such an abnormal state has arisen.

BRIEF DESCRIPTION I/F THE DRAWINGS

Exemplary embodiments of the present disclosure will be described in detail based on the following figures, wherein.

DETAILED DESCRIPTION

Figure 1:
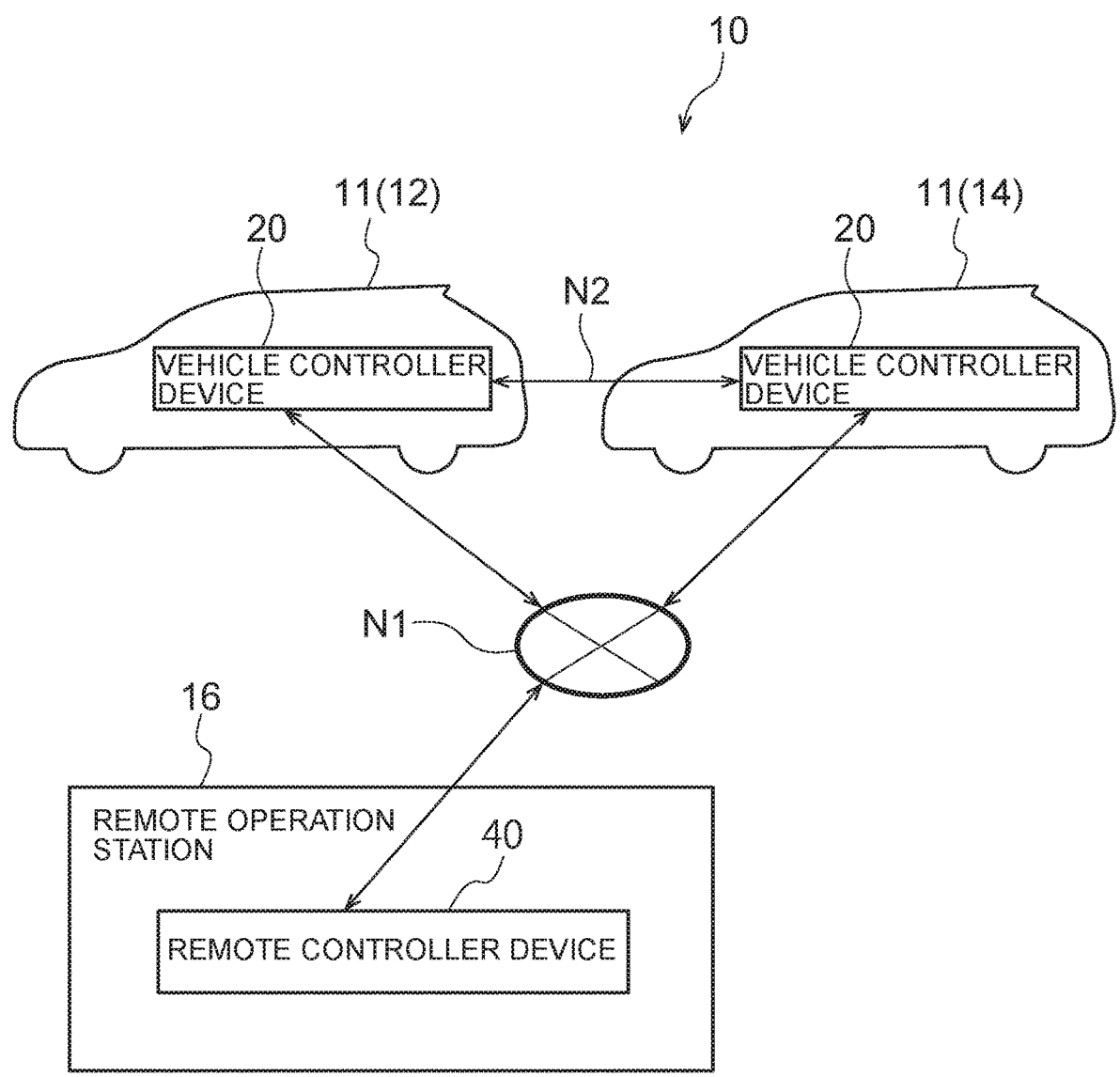
FIG. 1 is a diagram illustrating schematic configuration of a vehicle control system according to a first exemplary embodiment.

FIG. 1 is a block diagram illustrating schematic configuration of a vehicle control system 10 according to a first exemplary embodiment.

Outline

As illustrated in FIG. 1, the vehicle control system 10 according to the first exemplary embodiment is configured including autonomous driving-enabled vehicles 11 and a remote operation station 16 serving as an operation device. In the present exemplary embodiment, the autonomous driving-enabled vehicles 11 include a given vehicle 12 serving as a vehicle, and another vehicle 14 serving as another vehicle.

The given vehicle 12 and the other vehicle 14 of the present exemplary embodiment each include a vehicle controller device 20. The remote operation station 16 includes a remote controller device 40. In the vehicle control system 10, the vehicle controller device 20 of the given vehicle 12, the vehicle controller device 20 of the other vehicle 14, and the remote controller device 40 of the remote operation station 16 are connected to each other through a network N1. The respective vehicle controller devices 20 are capable of communicating directly with each other using inter-vehicle communication N2.

Note that although the vehicle control system 10 in FIG. 1 includes two of the autonomous driving-enabled vehicles 11 (the given vehicle 12 and the other vehicle 14) and a single remote operation station 16, the numbers thereof are not limited thereto. The vehicle control system 10 may include three or more of the autonomous driving-enabled vehicles 11, and may include two or more of the remote operation stations 16.

The given vehicle 12 is configured so as to be capable of implementing autonomous driving in which self-driving is performed by the vehicle controller device 20 based on a pre-generated travel plan, remote driving based on operation of the remote operation station 16 by a remote driver, and manual driving based on operation by an occupant of the given vehicle 12 (namely, a driver). Note that similarly to the given vehicle 12, the vehicle controller device 20 of the other vehicle 14 is also capable of implementing autonomous driving, remote driving, and manual driving.

Autonomous Driving-Enabled Vehicle

Figure 2:
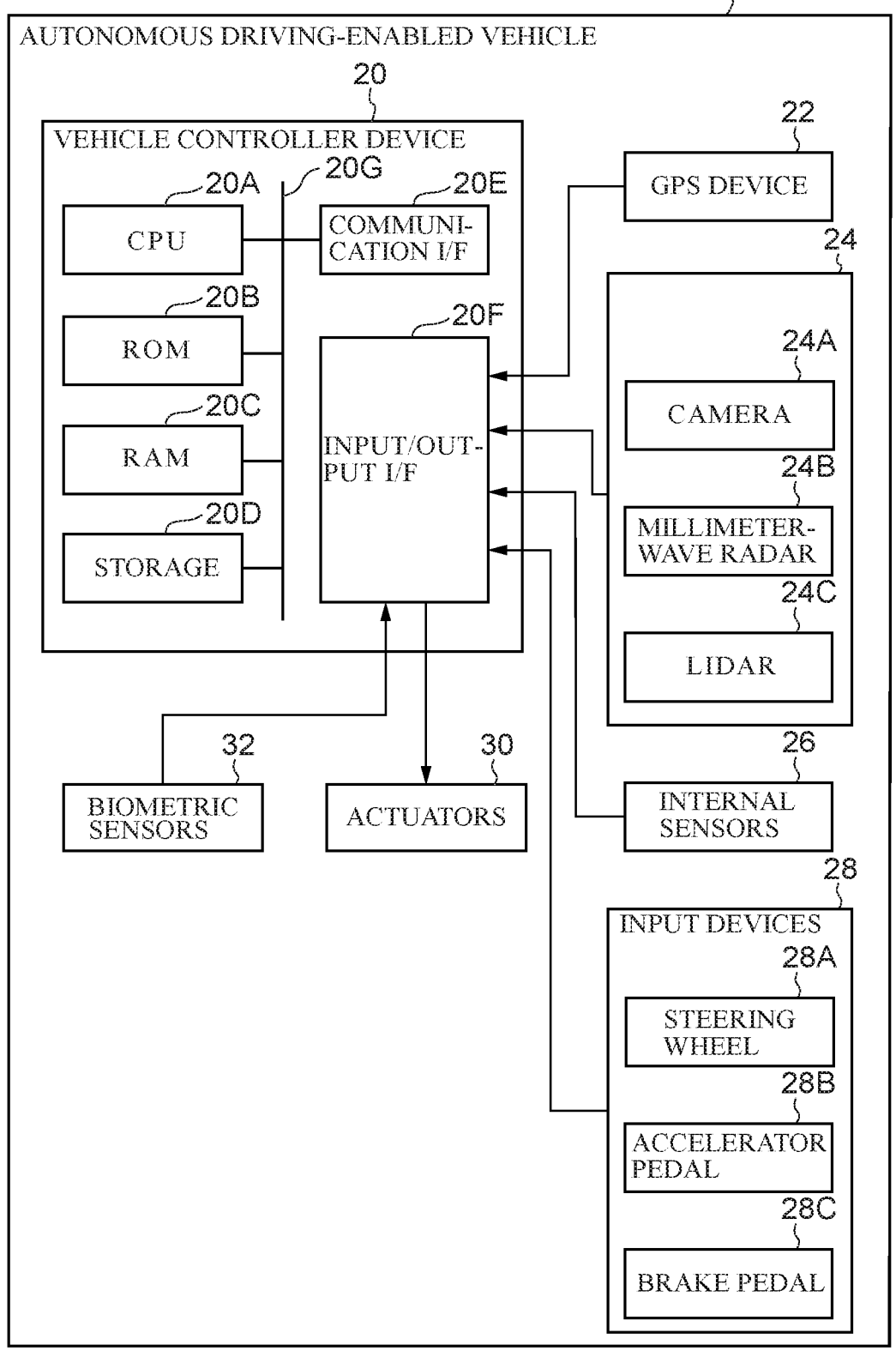
FIG. 2 is a block diagram illustrating hardware configuration of a vehicle in the first exemplary embodiment.

FIG. 2 is a block diagram illustrating hardware configuration of equipment installed in each of the autonomous driving-enabled vehicles 11 of the present exemplary embodiment. Note that since the given vehicle 12 and the other vehicle 14 configuring the autonomous driving-enabled vehicles 11 of the present exemplary embodiment are configured similarly to each other, explanation will be given regarding the given vehicle 12 only. In addition to the vehicle controller device 20 described above, the given vehicle 12 includes a global positioning system (GPS) device 22, external sensors 24, internal sensors 26, input devices 28, actuators 30, and biometric sensors 32.

The vehicle controller device 20 is configured including a central processing unit (CPU) 20A, read only memory (ROM) 20B, random access memory (RAM) 20C, storage 20D, a communication interface (I/F) 20E, and an input/output I/F 20F. The CPU 20A, the ROM 20B, the RAM 20C, the storage 20D, the communication I/F 20E and the input/output I/F 20F are connected together so as to be capable of communicating with each other through a bus 20G The CPU 20A is an example of a processor, and the RAM 20C is an example of memory.

Figure 3:
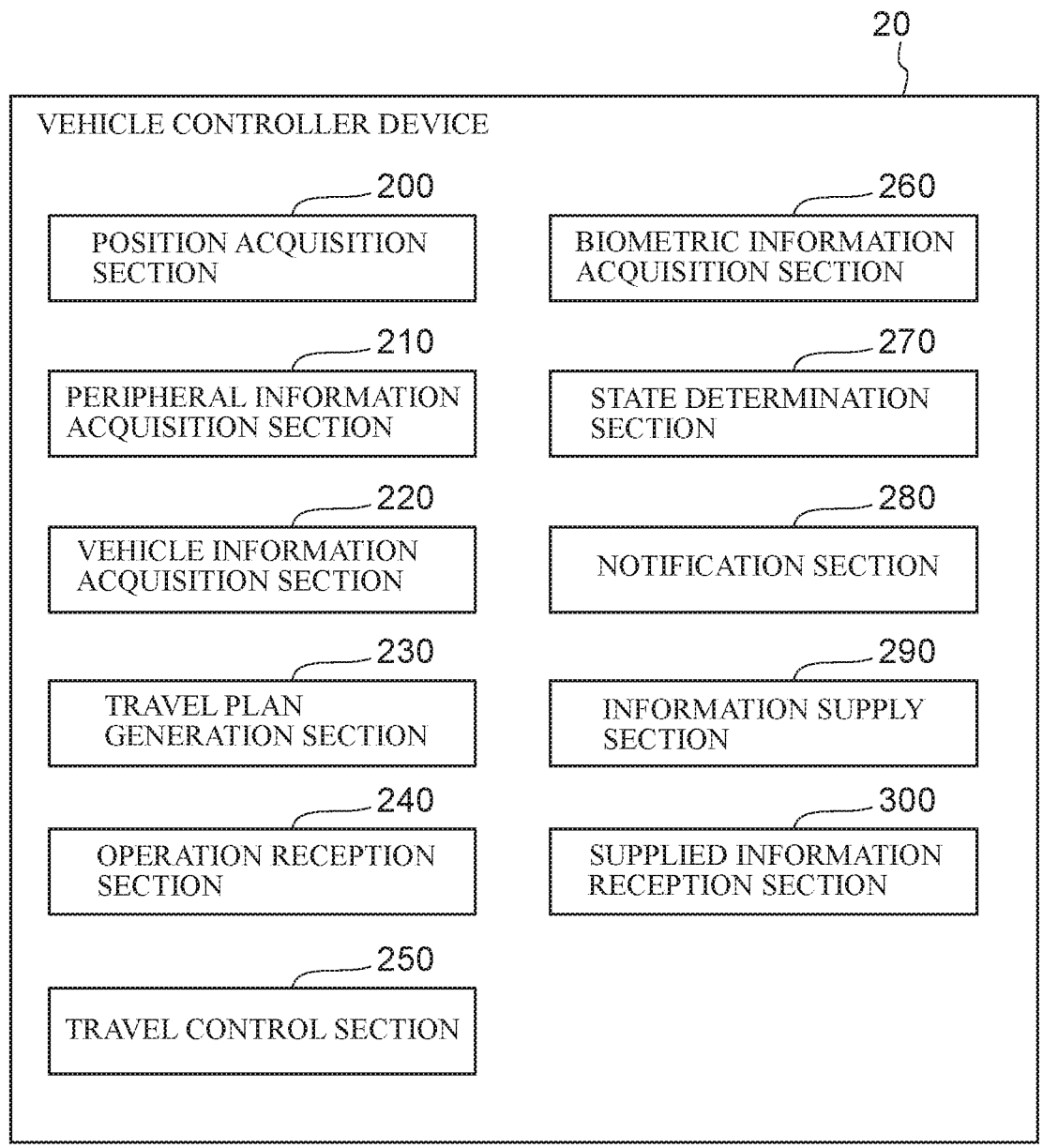
FIG. 3 is a block diagram illustrating an example of functional configuration of a vehicle controller device in the first exemplary embodiment.

The CPU 20A is a central processing unit that executes various programs and controls various sections. Namely, the CPU 20A reads a program from the ROM 20B and executes the program, using the RAM 20C as a workspace. In the present exemplary embodiment, an execution program is stored in the ROM 20B. When the CPU 20A executes the execution program, the vehicle controller device 20 functions as a position acquisition section 200, a peripheral information acquisition section 210, a vehicle information acquisition section 220, a travel plan generation section 230, an operation reception section 240, a travel control section 250, a biometric information acquisition section 260, a state determination section 270, a notification section 280, an information supply section 290, and a supplied information reception section 300, as illustrated in FIG. 3.

The ROM 20B illustrated in FIG. 2 stores various programs and various data. The RAM 20C serves as a workspace to temporarily store the programs or data.

The storage 20D serves as a storage section, is configured by a hard disk drive (HDD) or a solid state drive (SSD), and stores various programs including an operating system, as well as various data. Information relating to an abnormal state and an abnormality predicted state, described later, as well as biometric information and risk information are also stored in an associated state in the storage 20D.

The communication I/F 20E serves as a communication section, and includes an interface for connecting to the network N1 in order to communicate with other vehicle controller devices 20, the remote controller device 40, a non-illustrated information server, and the like. A communication protocol such as Long Term Evolution (LTE) or Wi-Fi (registered trademark) is employed as the interface. Moreover, the communication I/F 20E includes a wireless device to communicate directly with the other vehicle controller devices 20 using the inter-vehicle communication N2.

The communication I/F 20E of the present exemplary embodiment transmits an image captured by a camera 24A to the remote operation station 16 that is external to the given vehicle 12, and receives remote operation information, this being operation information for operating the given vehicle 12, from the remote operation station 16 through the network N1. The communication I/F 20E also transmits risk information, described later, to the other vehicle 14, this being another vehicle, using the inter-vehicle communication N2 employing Dedicated Short Range Communications (DSRC) or the like. Note that the communication I/F 20E may also receive weather information, earthquake information, and traffic information regarding traffic jams, accidents, roadworks, and so on from an external information server through the network N1.

The input/output I/F 20F is an interface for communicating with the various devices installed in the given vehicle 12. In the vehicle controller device 20 of the present exemplary embodiment, the GPS device 22, the external sensors 24, the internal sensors 26, the input devices 28, the actuators 30, and the biometric sensors 32 are connected through the input/output I/F 20F. Note that the GPS device 22, the external sensors 24, the internal sensors 26, the input devices 28, the actuators 30, and the biometric sensors 32 may be directly connected through the bus 20G.

The GPS device 22 is a device for measuring the current position of the given vehicle 12. The GPS device 22 includes an antenna (not illustrated in the drawings) to receive signals from GPS satellites.

The external sensors 24 serve as a peripheral information detection section, and are a group of sensors that detect peripheral information regarding the surroundings of the given vehicle 12. The external sensors 24 include the camera 24A that images a predetermined range, millimeter-wave radar 24B that transmits scanning waves over a predetermined range and receives the reflected waves, and laser imaging detection and ranging (LIDAR) 24C that scans a predetermined range.

The internal sensors 26 are a group of sensors that detect travel states of the given vehicle 12. The internal sensors 26 include at least one out of a vehicle speed sensor, an acceleration sensor, or a yaw rate sensor.

The input devices 28 are a group of switches to be operated by the occupant on board the given vehicle 12. The input devices 28 include a steering wheel 28A serving as a switch to steer the steered wheels of the given vehicle 12, an accelerator pedal 28B serving as a switch to cause the given vehicle 12 to accelerate, and a brake pedal 28C serving as a switch to cause the given vehicle 12 to decelerate.

The actuators 30 include a steering wheel actuator to drive the steered wheels of the given vehicle 12, an accelerator actuator to control acceleration of the given vehicle 12, and a brake actuator to control deceleration of the given vehicle 12.

The biometric sensors 32 include various sensors that detect information in order to infer biometric information, described later, of the occupant of the vehicle. As an example, the biometric sensors 32 include at least one out of an on-board camera that images the head of the occupant, a thermographic camera that detects the body temperature of the occupant, a sound pick-up microphone that picks up sounds generated inside the vehicle cabin, a body pressure sensor that detects load of a seated occupant against a seat, a webbing sensor that detects a webbing pull-out amount, or various sensors that detect vital signs of the occupant.

FIG. 3 is a block diagram illustrating an example of functional configuration of the vehicle controller device 20. As illustrated in FIG. 3, the vehicle controller device 20 includes the position acquisition section 200, the peripheral information acquisition section 210, the vehicle information acquisition section 220, the travel plan generation section 230, the operation reception section 240, the travel control section 250, the biometric information acquisition section 260, the state determination section 270, the notification section 280, the information supply section 290, and the supplied information reception section 300. Each of these functional configurations is implemented by the CPU 20A reading the execution program stored in the ROM 20B, and executing this program.

The position acquisition section 200 includes functionality to acquire the current position of the given vehicle 12. The position acquisition section 200 acquires position information from the GPS device 22 through the input/output I/F 20F.

The peripheral information acquisition section 210 serves as an acquisition section, and includes functionality to acquire peripheral information regarding the periphery of the given vehicle 12. The peripheral information acquisition section 210 acquires the peripheral information regarding the given vehicle 12 from the external sensors 24 through the input/output I/F 20F. The "peripheral information" includes not only information regarding vehicles and pedestrians in the surroundings of the given vehicle 12, but also regarding the weather, brightness, road width, obstacles, and so on.

The vehicle information acquisition section 220 includes functionality to acquire vehicle information such as the vehicle speed, acceleration, yaw rate, and so on of the given vehicle 12. The vehicle information acquisition section 220 acquires the vehicle information regarding the given vehicle 12 from the internal sensors 26 through the input/output I/F 20F.

The travel plan generation section 230 includes functionality to generate a travel plan to cause the given vehicle 12 to travel based on the position information acquired by the position acquisition section 200, the peripheral information acquired by the peripheral information acquisition section 210, and the vehicle information acquired by the vehicle information acquisition section 220. The travel plan includes not only a travel route to a pre-set destination, but also information regarding a course to avoid obstacles ahead of the given vehicle 12, the speed of the given vehicle 12, and so on.

The operation reception section 240 includes functionality to receive signals output from the various input devices 28 when manual driving is being performed based on operation by the occupant of the given vehicle 12. The operation reception section 240 also generates vehicle operation information, this being operation information for controlling the actuators 30, based on signals received from the various input devices 28.

The travel control section 250 includes functionality to control autonomous driving based on the travel plan generated by the travel plan generation section 230, remote driving based on the remote operation information received from the remote operation station 16, and manual driving based on the vehicle operation information received from the operation reception section 240.

The biometric information acquisition section 260 includes functionality to acquire the biometric information of the occupant. The biometric information acquisition section 260 acquires the biometric information of the occupant from the biometric sensors 32 and the input devices 28 through the input/output I/F 20F. Note that the biometric information acquirable from the biometric sensors 32 includes the gaze direction, facial position, expression, posture, breathing sound, body temperature, pulse, and blood pressure of the occupant. The biometric information acquirable from the input devices 28 includes steering force applied to the steering wheel 28A and pedal depression force applied to the accelerator pedal 28B and the brake pedal 28C. The biometric information acquisition section 260 acquires at least one out of these biometric information types.

The state determination section 270 determines, based on the biometric information acquired by the biometric information acquisition section 260, whether or not the occupant is in an abnormal state in which manual driving by operation by the occupant is compromised, or an abnormality predicted state in which manual driving is predicted to become compromised. Determination based on the biometric information as to whether or not the abnormal state or the abnormality predicted state has arisen is for example performed by setting two levels of threshold values for parameters of the various biometric information described above. Namely, the state determination section 270 determines that the occupant is in the abnormality predicted state when, for a predetermined determination period or longer, a detection value for each type of biometric information is detected as being equal to or greater than an abnormality predicted state threshold value but less than an abnormal state threshold value. The state determination section 270 determines that the occupant is in the abnormal state when a detection value for each type of biometric information is detected as being equal to or greater than the abnormal state threshold value for a predetermined determination period or longer.

The state determination section 270 also determines whether or not the occupant is in the abnormality predicted state based on risk information supplied from other vehicles. When determining the abnormality predicted state based on the risk information, for example a threshold value is set for a parameter of the risk information, described later, and the abnormality predicted state is determined to have arisen in cases in which a detection value equal to or greater than this threshold value is detected. The state determination section 270 may also determine the abnormality predicted state to have arisen in cases in which the number of times risk information has been supplied has exceeded a predetermined value.

In cases in which determination is made as to whether or not the abnormal state or the abnormality predicted state has arisen based on risk information received from nearby vehicles, two levels of threshold values are set regarding the number of times risk information is received, the number of vehicles that have supplied this information, or the like, and these are used in determination of the abnormal state or the abnormality predicted state.

The notification section 280 includes functionality to notify the remote operation station 16 of the state that has arisen in cases in which either the abnormal state or the abnormality predicted state is determined to have arisen by the state determination section 270.

The information supply section 290 supplies risk information to another vehicle installed with a vehicle controller device 20 in order to indicate that the other vehicle is traveling in a high-risk manner. Specifically, the information supply section 290 transmits the risk information to the other vehicle through the communication I/F 20E. Note that determination as to whether or not another vehicle is traveling in a high-risk manner is made based on peripheral information detected by the external sensors 24. Factors affecting whether another vehicle is traveling in a high-risk manner include, for example, snaking, poor lane discipline, sudden acceleration, sudden deceleration, and insufficient distance from a vehicle in front by the other vehicle. Note that determination as to whether or not a manner of travel is high-risk may be a visual judgement by an occupant. In such cases, the occupant may operate an operation section in order to transmit the risk information.

The supplied information reception section 300 includes functionality to receive risk information transmitted from another vehicle installed with a vehicle controller device 20 through the communication I/F 20E.

Remote Operation Station

Figure 4:
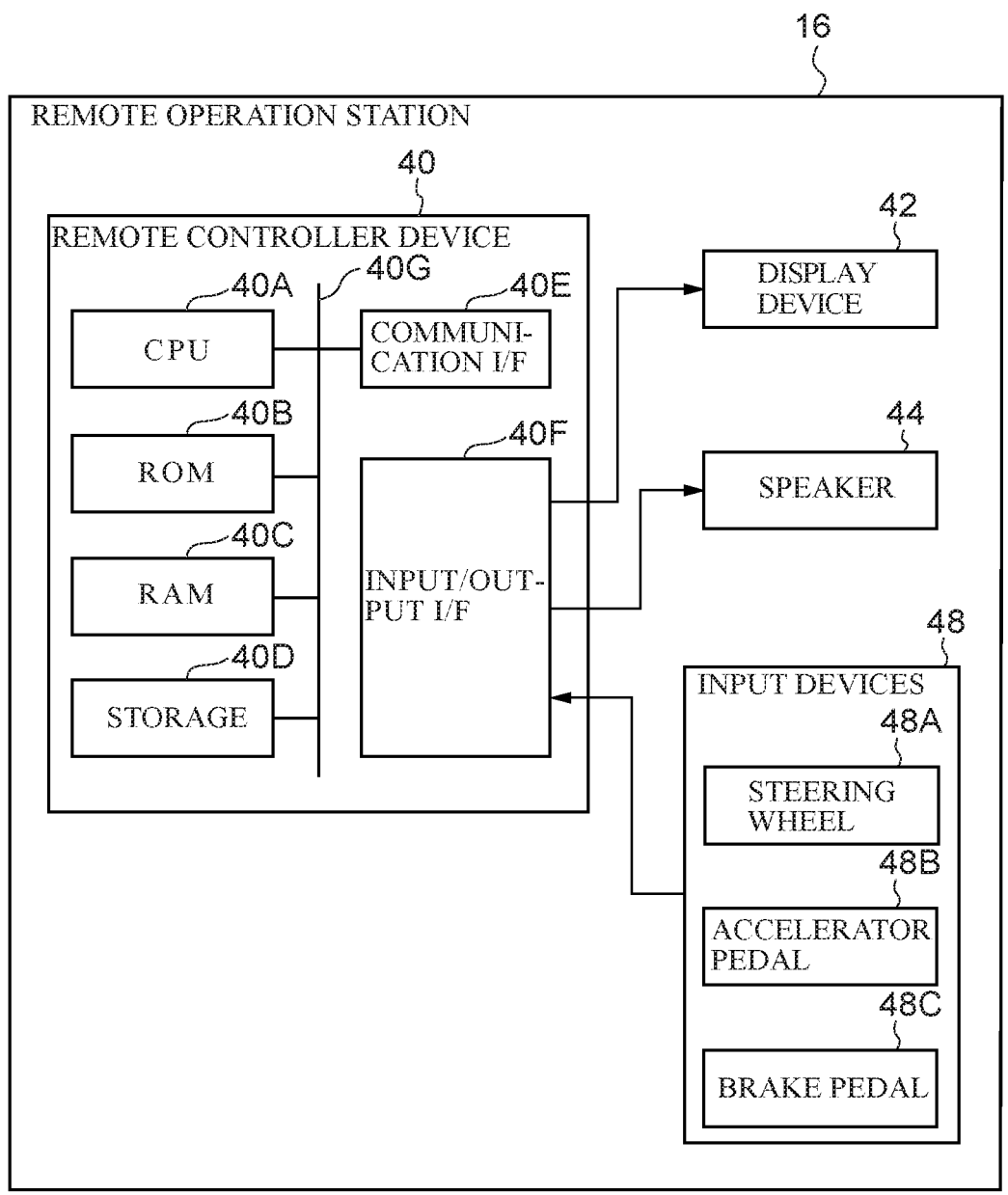
FIG. 4 is a block diagram illustrating an example of hardware configuration of a remote operation station in the first exemplary embodiment.

FIG. 4 is a block diagram illustrating hardware configuration of equipment installed in the remote operation station 16 of the present exemplary embodiment. In addition to the remote controller device 40 previously described, the remote operation station 16 also includes a display device 42, a speaker 44, and input devices 48.

The remote controller device 40 is configured including a CPU 40A, ROM 40B, RAM 40C, storage 40D, a communication I/F 40E and an input/output I/F 40F. The CPU 40A, the ROM 40B, the RAM 40C, the storage 40D, the communication I/F 40E, and the input/output I/F 40F are connected together so as to be capable of communicating with each other through a bus 40G Functionality of the CPU 40A, the ROM 40B, the RAM 40C, the storage 40D, the communication I/F 40E, and the input/output I/F 40F matches that of the CPU 20A, the ROM 20B, the RAM 20C, the storage 20D, the communication I/F 20E, and the input/output I/F 20F of the vehicle controller device 20 previously described.

Figure 5:
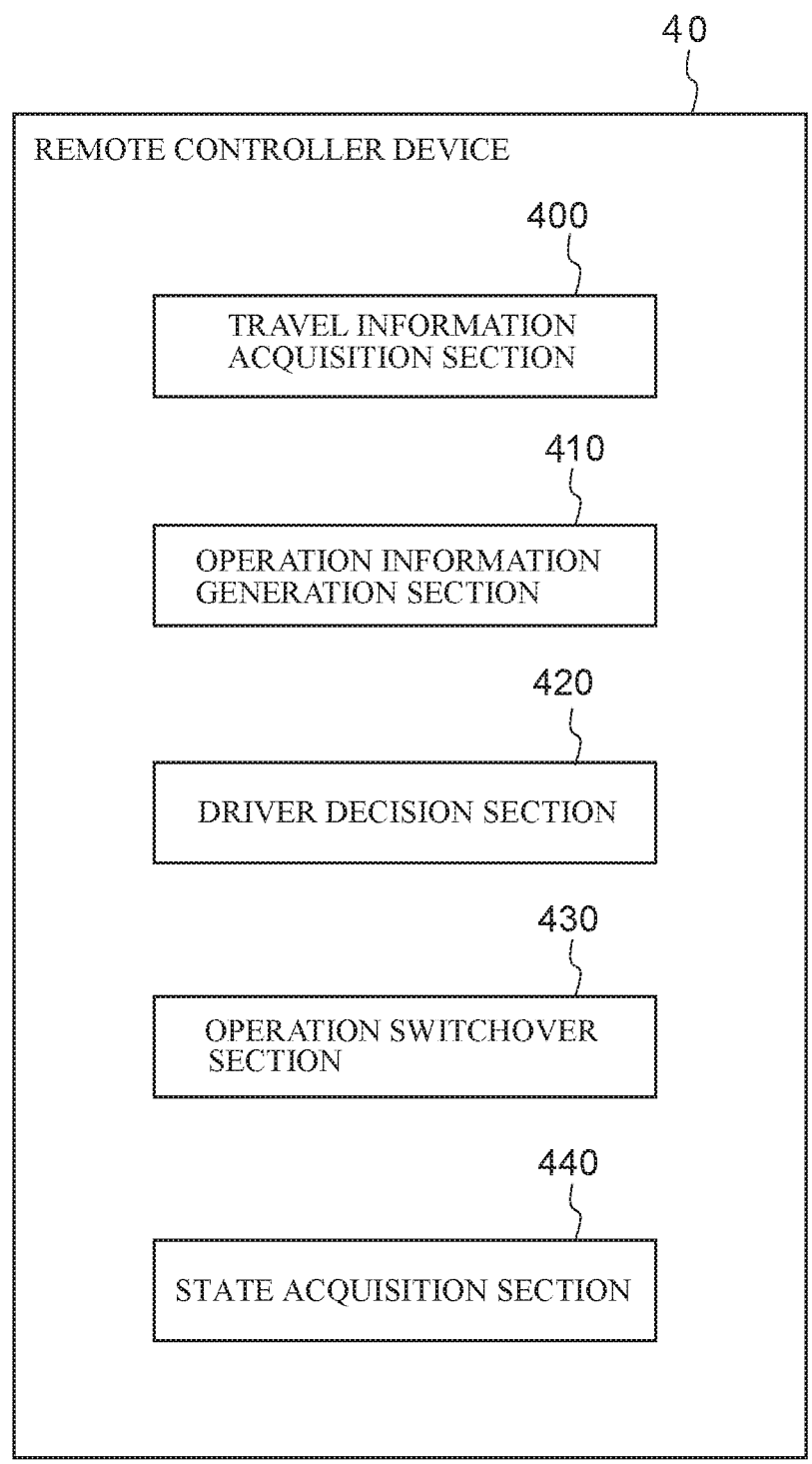
FIG. 5 is a block diagram illustrating an example of functional configuration of a remote controller device in the first exemplary embodiment.

The CPU 40A reads a program from the ROM 40B and executes the program, using the RAM 40C as a workspace. In the present exemplary embodiment, a processing program is stored in the ROM 40B. When the CPU 40A executes the processing program, the remote controller device 40 functions as a travel information acquisition section 400, an operation information generation section 410, a driver decision section 420, an operation switchover section 430, and a state acquisition section 440 as illustrated in FIG. 5.

The display device 42, the speaker 44, and the input devices 48 are connected to the remote controller device 40 of the present exemplary embodiment through the input/output I/F 40F. Note that the display device 42, the speaker 44, and the input devices 48 may be directly connected through the bus 40G.

The display device 42 is a liquid crystal monitor for displaying an image captured by the camera 24A of the given vehicle 12 and various information relating to the given vehicle 12.

The speaker 44 is a speaker for replaying audio recorded by a microphone (not illustrated in the drawings) attached to the camera 24A of the given vehicle 12 together with the captured image.

The input devices 48 are controllers to be operated by the remote driver serving as a remote driving operator using the remote operation station 16. The input devices 48 include a steering wheel 48A serving as a switch to steer the steered wheels of the given vehicle 12, an accelerator pedal 48B serving as a switch to cause the given vehicle 12 to accelerate, and a brake pedal 48C serving as a switch to cause the given vehicle 12 to decelerate. Note that the implementation of the respective input devices 48 is not limited thereto. For example, a lever switch may be provided instead of the steering wheel 48A. As another example, push button switches or lever switches may be provided instead of the pedal switches of the accelerator pedal 48B or the brake pedal 48C.

FIG. 5 is a block diagram illustrating an example of functional configuration of the remote controller device 40. As illustrated in FIG. 5, the remote controller device 40 includes the travel information acquisition section 400, the operation information generation section 410, the driver decision section 420, the operation switchover section 430, and the state acquisition section 440.

The travel information acquisition section 400 includes functionality to acquire audio as well as the image captured by the camera 24A and transmitted by the vehicle controller device 20, and also acquire vehicle information such as the vehicle speed. The acquired captured image and vehicle information are displayed on the display device 42, and the audio information is output through the speaker 44.

The operation information generation section 410 includes functionality to receive signals output from the various input devices 48 when remote driving is being performed based on operation by the remote driver. The operation information generation section 410 also generates remote operation information to be transmitted to the vehicle controller device 20 based on the signals received from the various input devices 48.

The driver decision section 420 includes functionality to decide on a remote driver to operate the remote operation station 16. For example, in cases in which plural remote drivers are available, the driver decision section 420 decides on one remote driver to be the remote driver to perform operation.

The operation switchover section 430 includes functionality to execute switching of the vehicle controller device 20 to remote driving. When the remote driver who is to perform remote driving operates a non-illustrated operation section of the remote operation station 16, a switchover prepared signal serving as operation-ready information is output to the vehicle controller device 20. For example, when switchover information relating to switching to remote driving has already been received from the vehicle controller device 20 of the given vehicle 12, the operation switchover section 430 outputs a switchover prepared signal to the vehicle controller device 20, and the given vehicle 12 is thereby switched from autonomous driving or manual driving to remote driving. As another example, when the operation switchover section 430 transmits the switchover prepared signal to the vehicle controller device 20 first, switchover of the given vehicle 12 from autonomous driving or manual driving to remote driving is performed at the stage when information relating to switching to remote driving is received from the vehicle controller device 20.

The state acquisition section 440 includes functionality to acquire information relating to a state of the occupant as transmitted from the vehicle controller device 20 through the communication I/F 40E. Specifically, information that the occupant is in the abnormal state or information that the occupant is in the abnormality predicted state is acquired.

Control Flow

In the vehicle controller device 20 of the present exemplary embodiment, state notification processing is executed in order to notify the remote operation station 16 that the occupant of the given vehicle 12 is in the abnormal state or the abnormality predicted state. Explanation follows regarding the flow of state notification processing, with reference to the flowchart of FIG. 6.

Figure 6:
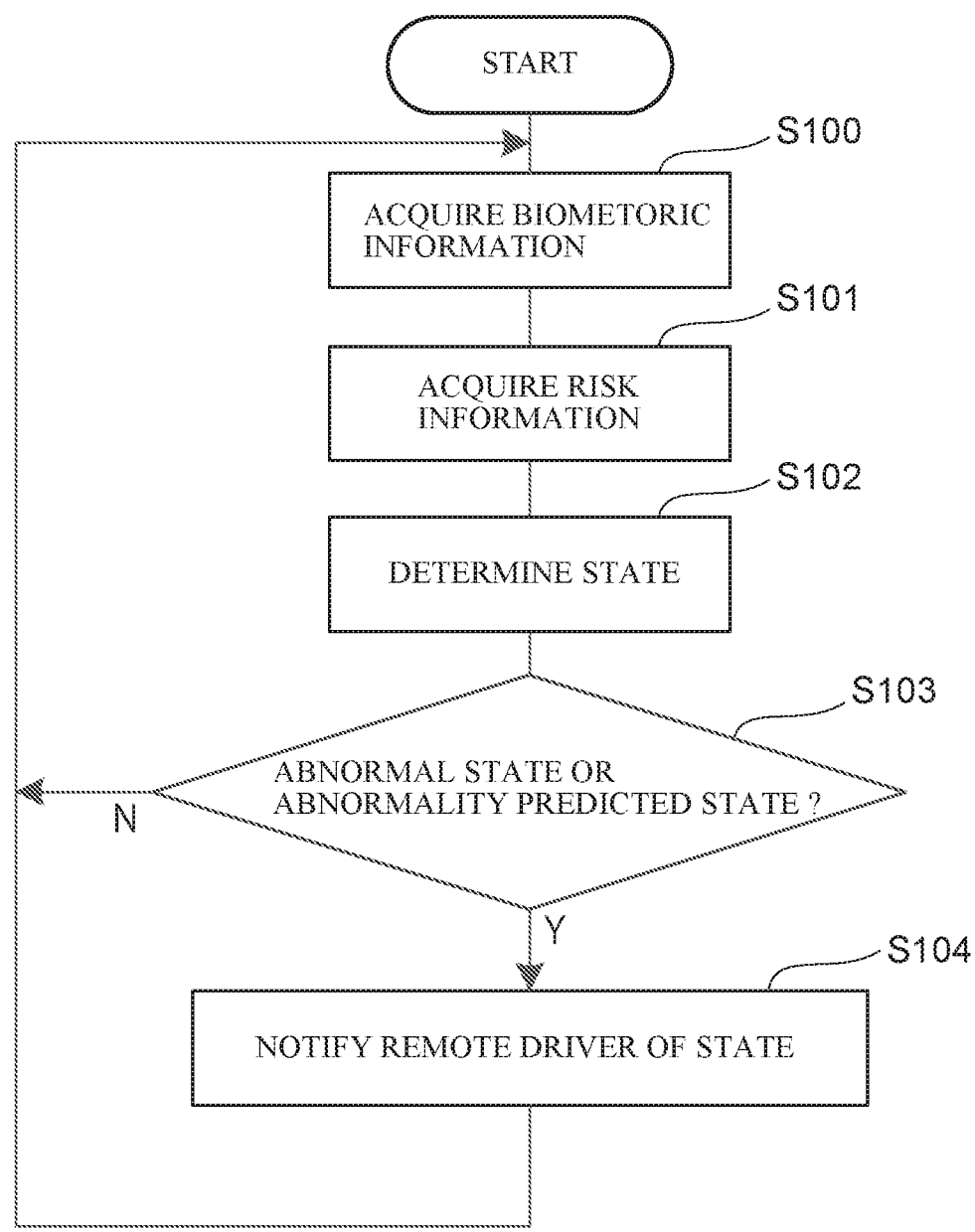
FIG. 6 is a flowchart explaining a flow of state notification processing in the first exemplary embodiment.

At step S100 in FIG. 6, the CPU 20A acquires biometric information from the input devices 28 and the biometric sensors 32. At step S101, the CPU 20A attempts to communicate with the vehicle controller device 20 of the other vehicle 14 using the inter-vehicle communication N2. Then, in cases in which risk information has been transmitted from the vehicle controller device 20 of the other vehicle 14, the CPU 20A acquires this risk information.

At step S102, the CPU 20A determines the state of the occupant based on the acquired biometric information and risk information. Specifically, the occupant is determined to be in whichever state is applicable out of a normal state indicating that the occupant is capable of manual driving, the abnormal state described above, or the abnormality predicted state described above.

Processing proceeds to step S104 in cases in which the CPU 20A determines that the occupant is in the abnormal state or the abnormality predicted state at step S103. Processing returns to step S100 in cases in which the CPU 20A determines that neither the abnormal state nor the abnormality predicted state has arisen.

At step S104, the CPU 20A notifies the remote operation station 16 of the determined state of the occupant, and then processing returns to step S100 and is repeated.

In the vehicle controller device 20 of the present exemplary embodiment, in cases in which the occupant is determined to be in the abnormal state or the abnormality predicted state during manual driving, handover processing is executed in order to hand over operation to a remote driver of the remote operation station 16. Explanation follows regarding the flow of this handover processing, with reference to the flowchart of FIG. 7.

Figure 7:
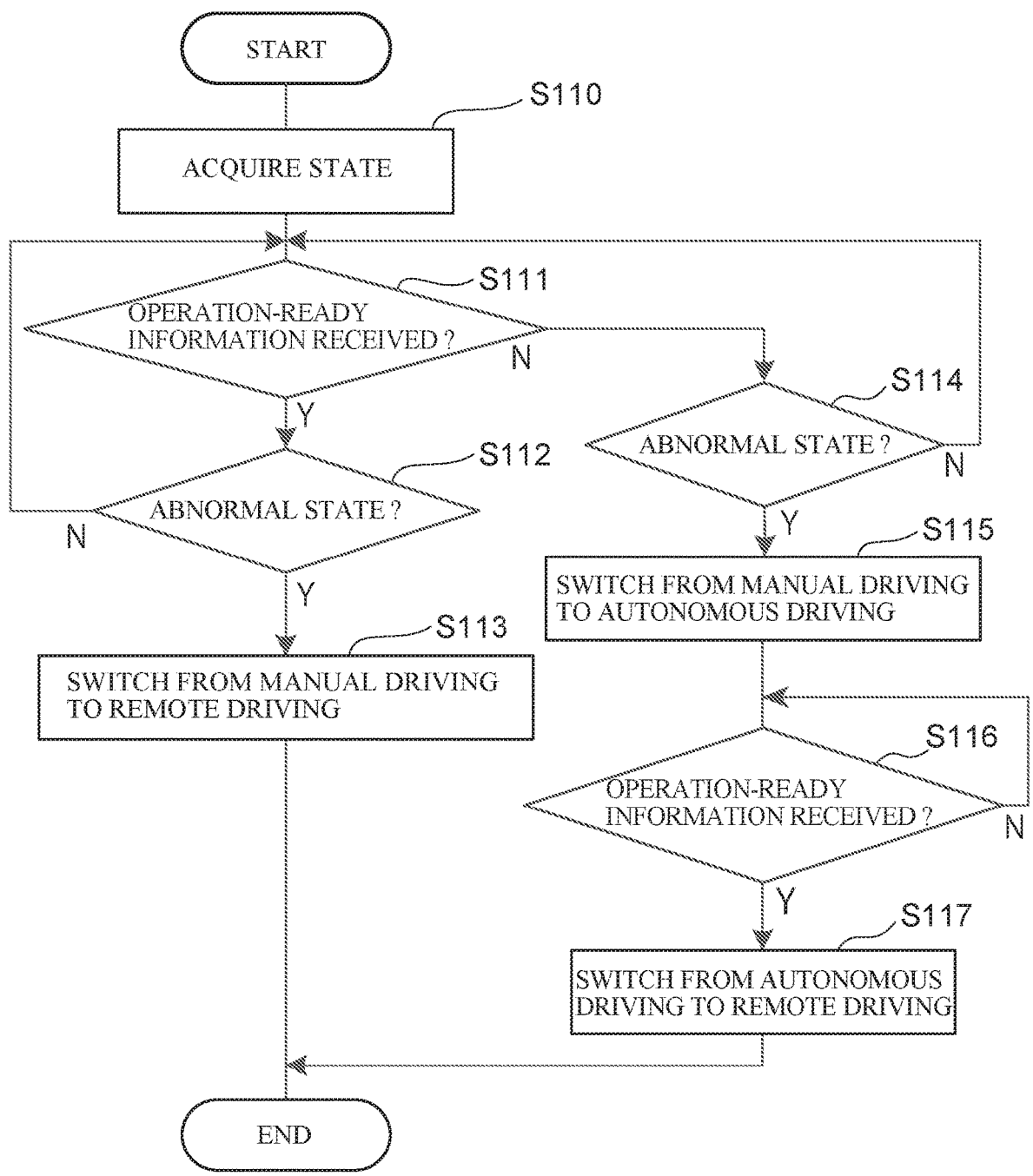
FIG. 7 is a flowchart explaining a flow of handover processing in the first exemplary embodiment.

At step S110 in FIG. 7, the CPU 20A acquires the occupant state as determined based on the biometric information and the risk information.

At step S111, the CPU 20A determines whether or not operation-ready information indicating that operation by a remote driver is possible has been received from the remote operation station 16. Processing proceeds to step S112 in cases in which the CPU 20A determines that the operation-ready information has been received. Processing proceeds to step S114 in cases in which the CPU 20A determines that the operation-ready information has not been received.

At step S112, the CPU 20A determines whether or not the occupant is in the abnormal state based on the biometric information and the risk information. Processing proceeds to step S113 in cases in which the CPU 20A determines that the abnormal state has arisen. Processing returns to step S110 in cases in which determination is made that the abnormal state has not arisen.

At step S113, the CPU 20A executes switchover processing to switch from manual driving to remote driving. The CPU 20A also notifies the remote driver that remote driving has started, and ends the processing.

In cases in which the CPU 20A determined that the operation-ready information has not been received from the remote driver at step S111 and processing has proceeded to step S114, the CPU 20A determines whether or not the occupant is in the abnormal state based on the biometric information and the risk information. Processing proceeds to step S115 in cases in which the CPU 20A determines that the abnormal state has arisen. Processing returns to step S111 in cases in which the determination is made that the abnormal state has not arisen.

At step S115, the CPU 20A executes switchover processing to switch from manual driving to autonomous driving. Namely, in cases in which the occupant is determined to be in the abnormal state before a remote driver has been secured, the given vehicle 12 continues to travel by performing autonomous driving.

At step S116, the CPU 20A determines whether or not the operation-ready information has been received from the remote driver. Processing proceeds to step S117 in cases in which the operation-ready information is determined to have been received. The processing of step S116 is repeated in cases in which the operation-ready information is determined not to have been received. Autonomous driving of the given vehicle 12 continues during this processing.

At step S117, the CPU 20A executes switchover processing to switch from autonomous driving to remote driving. The CPU 20A also notifies the remote driver that remote driving has started, and ends the processing.

Figure 8:
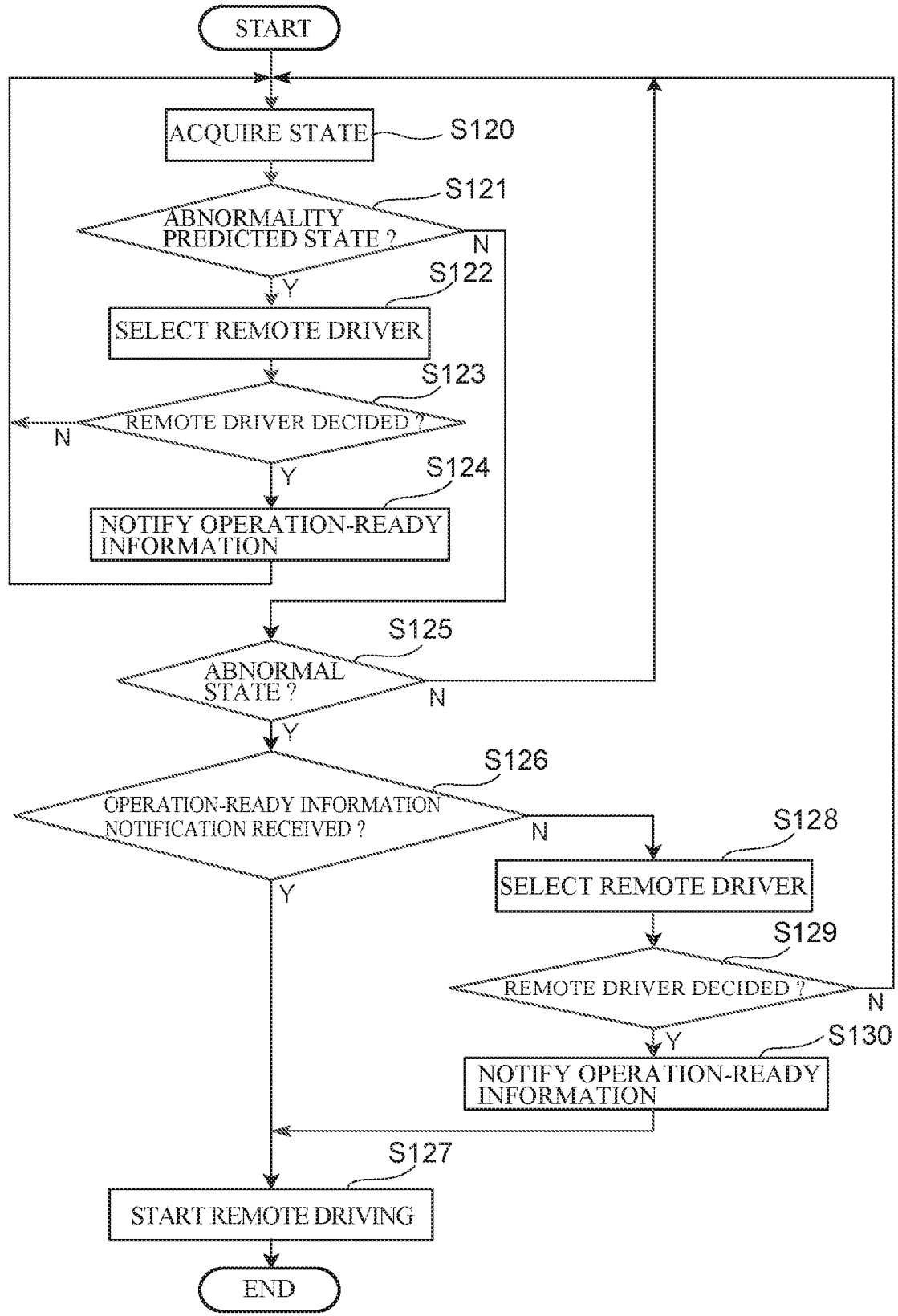
FIG. 8 is a flowchart explaining a flow of takeover processing in the first exemplary embodiment.

Next, explanation follows regarding a flow of takeover processing executed by the remote operation station 16, with reference to the flowchart of FIG. 8.

At step S120 in FIG. 7, the CPU 40A acquires an occupant state notification notified by the vehicle controller device 20.

At step S121, the CPU 40A determines whether or not the occupant is in the abnormality predicted state based on the acquired state notification. Processing proceeds to step S122 in cases in which the abnormality predicted state is determined to have arisen. Processing proceeds to step S125 in cases in which the abnormality predicted state is determined not to have arisen.

At step S122, the CPU 40A selects a remote driver to whom driving can be handed over from out of plural remote drivers.

At step S123, the CPU 40A determines whether or not the remote driver has been decided. Processing proceeds to step S124 in cases in which the CPU 40A determines that the remote driver has been decided. Processing returns to step S120 in cases in which determination is made that the remote driver could not be decided on.

At step S124, the CPU 40A notifies the vehicle controller device 20 of the operation-ready information, and then processing returns to step S120.

Processing proceeds to step S125 in cases in which the occupant is determined not to be in the abnormality predicted state at step S121. At step S125, the CPU 40A determines whether or not the occupant is in the abnormal state. Processing proceeds to step S126 in cases in which the CPU 40A determines that the abnormal state has arisen. Processing returns to step S120 in cases in which determination is made that the abnormal state has not arisen.

At step S126, the CPU 40A determines whether or not the vehicle controller device 20 has been notified of the operation-ready information. If the operation-ready information has been notified, this indicates that the remote driver has already been decided. Processing proceeds to step S127 in cases in which the CPU 40A determines that the operation-ready information has been notified. Processing proceeds to step S128 in cases in which determination is made that the operation-ready information has not been notified.

At step S127, the CPU 40A starts remote driving, and ends the processing.

In cases in which determination is made that the operation-ready information has not yet been notified at step S126 and processing has thus proceeded to step S128, the CPU 40A selects a remote driver to who driving can be handed over from out of plural remote drivers.

At step S129, the CPU 40A determines whether or not the remote driver has been decided. Processing proceeds to step S130 in cases in which the CPU 40A determines that the remote driver has been decided. Processing returns to step S120 in cases in which determination is made that the remote driver could not be decided on.

Operation and Advantageous Effects

In the exemplary embodiment described above, in cases in which determination is made, based on the biometric information of the occupant, that the abnormality predicted state has arisen in which manual driving of the given vehicle 12 is predicted to become compromised, or that the abnormal state has arisen in which manual driving is already compromised, the remote operation station 16 is notified of the determined state. The vehicle controller device 20 enables receipt of operation-ready information from the remote operation station 16 in response to the notification to indicate that remote driving of the vehicle by a remote driver is possible. The given vehicle 12 is thus capable of securing a remote driver before the occupant is determined to have reached the abnormal state, enabling a swift switch to remote driving when the abnormal state is determined to have arisen. Namely, the given vehicle 12 is capable of securing a remote driver at at least one timing out of before the occupant reaching the abnormal state, or when the abnormal state has arisen.

When the vehicle controller device 20 of the present exemplary embodiment performs notification to inform the remote operation station 16 of the abnormality predicted state or the abnormal state of the occupant, automatic switching from manual driving to remote driving is performed in cases in which the occupant is determined to be in the abnormal state after confirming that a remote driver has been secured. This enables a smooth switch to remote driving when an occupant abnormality has arisen.

Moreover, when the vehicle controller device 20 of the present exemplary embodiment performs notification to inform the remote operation station 16 of the abnormality predicted state or the abnormal state of the occupant, manual driving is switched to autonomous driving in cases in which the occupant is determined to be in the abnormal state before having confirmed that a remote driver has been secured. The vehicle can thus be made to travel safely by switching to autonomous driving as an alternative in cases in which an immediate switch to remote driving is compromised when an occupant abnormality has arisen.

As described above, in the present exemplary embodiment, after switching to autonomous driving before a remote driver has been secured, driving is then switched from autonomous driving to remote driving when operation-ready information is received. This enables a smooth switch to remote operation while maintaining safe travel of the given vehicle 12 when an occupant abnormality has arisen.

In the present exemplary embodiment, determination as to whether or not the abnormality predicted state has arisen is made based on at least one out of the biometric information of the occupant or risk information supplied from the other vehicle 14 traveling in the vicinity of the given vehicle 12, and the remote operation station 16 is notified of this determination. The abnormality predicted state can thus been determined based on information supplied from the other vehicle 14 as well as the biometric information of the occupant. Namely, determination of the abnormality predicted state is multifaceted, thus enabling a remote driver to be secured before the occupant reaches the abnormal state.

Additional Explanation

Although in the exemplary embodiment described above the remote driver who is notified of the abnormal state takes over driving of the given vehicle 12, namely, the remote operation station 16 acquires operation authority, there is no limitation thereto. The vehicle controller device 20 may be configured so as to confer operation authority to a remote driver when the abnormal state is determined to have arisen.

Although determination regarding the normal state, the abnormal state, and the abnormality predicted state is executed by the vehicle controller device 20 in the handover processing of the exemplary embodiment described above, this determination may be executed by an external information server connected to the given vehicle 12 through the network N1.

Moreover, the threshold values for the biometric information employed in determination of the normal state, the abnormal state, and the abnormality predicted state may be set individually according to personal data of each occupant stored in the storage 20D of the vehicle controller device 20, or in an external server. Such personal data may be formed by accumulating biometric information acquired on previous rides.

Note that in the exemplary embodiment described above, the occupant whose biometric information is detected is not limited to being the occupant of a driving seat, and may be the occupant of a front passenger seat or the occupant of a rear seat.

Note that the handover processing executed by the CPU 20A reading software (a program), and the takeover processing executed by the CPU 40A reading software (a program) in the exemplary embodiment described above may be executed by various processors other than CPUs. Examples of such processors include programmable logic devices (PLDs) such as field-programmable gate arrays (FPGAs) that have a circuit configuration that can be modified following manufacture, or dedicated electrical circuits, these being processors such as application specific integrated circuits (ASICs) that have a custom designed circuit configuration to execute specific processing. The handover processing and the takeover processing may be executed by one of these processors, or may be executed by a combination of two or more processors of the same type or different types to each other (for example a combination of plural FPGAs, or a combination of a CPU and an FPGA). A more specific example of a hardware structure of these various processors is electric circuitry combining circuit elements such as semiconductor elements.

The exemplary embodiment described above describes a format in which the programs are stored (installed) in advance on a non-transient computer-readable recording medium. For example, the execution program employed by the vehicle controller device 20 of each of the autonomous driving-enabled vehicles 11 is stored in advance in the ROM 20B. The processing program employed by the remote controller device 40 of the remote operation station 16 is stored in advance in the ROM 40B. However, there is no limitation thereto, and the respective programs may be provided in a format recorded on a non-transient recording medium such as compact disc read only memory (CD-ROM), digital versatile disc read only memory (DVD-ROM), or universal serial bus (USB) memory. Alternatively, the respective programs may be configured in a format to be downloaded from an external device through a network.

The flows of processing in the exemplary embodiment described above are given as examples, and unnecessary steps may be omitted, new steps added, and the processing sequence rearranged within a range not departing from the spirit thereof

What is claimed is:

1. A vehicle controller device, comprising:
a memory; and
a processor that is connected to the memory, the processor being configured to:
receive operation information for operating a vehicle from an operation device disposed externally to the vehicle and operated by a remote operator;
acquire peripheral information from an external sensor installed facing an outside of the vehicle, the external sensor including at least one of a camera, a millimeter wave radar and a LIDAR,
generate a travel plan for the vehicle based on the peripheral information,
control autonomous driving in which the vehicle travels based on the generated travel plan, and control remote driving in which the vehicle travels based on the received operation information,
acquire biometric information of an occupant,
determine, based on the acquired biometric information, whether or not an abnormality predicted state has arisen in which manual driving by operation by the occupant is predicted to become compromised, and also whether or not an abnormal state has arisen in which manual driving is compromised, the determination whether or not the abnormality predicted state or the abnormal state has arisen including setting two levels of threshold values for the acquired biometric information, and including a first determination that the abnormality predicted state has arisen, the first determination occurring when the acquired biometric information is equal to or greater than a first of the two levels of the threshold values but lower than a second of the two levels of the threshold values, and a second determination that the abnormal state has arisen, the second determination occurring when the acquired biometric information is equal to or greater than the second of the two levels of threshold values,
notify the operation device of a determined state when either the abnormality predicted state or the abnormal state is determined, by the determining, to have arisen, enable receipt of operation-ready information from the operation device in response to the notification, the operation-ready information indicating that operation by the remote operator is possible, after notifying the operation device of the determined state, further determine whether the occupant is in the abnormal state before the operation-ready information has been received in response to the notification, and, when it is determined that the occupant is in the abnormal state before the operation-ready information has been received, switch from the manual driving to the autonomous driving.

2. The vehicle controller device of claim 1, wherein the processor is further configured to determine whether the occupant is in the abnormal state after the operation-ready information has been received in response to the notification, and, when it is determined that the occupant is in the abnormal state before the operation-ready information has been received, switch from the manual driving to the remote driving.

3. The vehicle controller device of claim 1, wherein the processor is further configured to determine whether the operation-ready information is received during the autonomous driving, and, when it is determined that the operation-ready information is received during the autonomous driving, switch from the autonomous driving to the remote driving.

4. The vehicle controller device of claim 1, wherein the processor is further configured to:

receive risk information indicating that a manner of travel of the vehicle is high-risk, from another vehicle traveling in the vicinity of the vehicle; and determine whether or not the abnormality predicted state has arisen based on at least one of the biometric information or the received risk information, and notify the operation device of the determined state.

* * * * *